United States Patent [19]

Robinson, Jr.

[11] 4,128,846

[45] Dec. 5, 1978

[54] PRODUCTION OF MODULATION SIGNALS FROM AUDIO FREQUENCY SOURCES TO CONTROL COLOR CONTRIBUTIONS TO VISUAL DISPLAYS

[75] Inventor: Ernest G. Robinson, Jr., Houston, Tex.

[73] Assignee: Denis J. Kracker, Houston, Tex.

[21] Appl. No.: 792,936

[22] Filed: May 2, 1977

[51] Int. Cl.² .................... H04N 1/46; H04N 9/02; H04Q 9/02

[52] U.S. Cl. ........................ 358/82; 358/81; 340/148; 340/171 A

[58] Field of Search ............... 179/1 S; 358/82, 81; 84/464; 340/171 A, 148

[56] References Cited

U.S. PATENT DOCUMENTS

| | | | |
|---|---|---|---|
| 2,804,500 | 8/1957 | Giacoletto | 358/82 X |
| 2,982,814 | 5/1961 | Fine et al. | 358/82 |
| 3,604,852 | 9/1971 | Weintraub | 358/82 X |
| 3,723,652 | 3/1973 | Alles et al. | 179/1 SP |
| 3,969,972 | 7/1976 | Bryant | 179/1 SP X |
| 3,990,105 | 11/1976 | Fast | 358/82 |

Primary Examiner—John C. Martin
Assistant Examiner—Aristotelis M. Psitos
Attorney, Agent, or Firm—Browning, Bushman & Zamecki

[57] ABSTRACT

Disclosed are apparatus and method for modulating color contributions in visual displays with audio modulating signals. Particular embodiments disclosed separate input audio frequency signals into modulating signals characterized by particular frequency ranges. At least one such modulating signal is operated on by a gating circuit controlled by enabling signals from a voltage controlled oscillator. A level detector samples the modulating signal and feeds control signals to the voltage controlled oscillator in response to values of amplitude detected in the modulating signal. Generation and processing of the modulating signals may be provided as part of a visual display system such as a color television receiver or eidophor system, or such signals may be transmitted through the antenna input of such a system. Each electron gun in the visual display system is then modulated by a different modulating signal, resulting in varied color displays in response to the frequency and magnitude of the input audio frequency signals.

23 Claims, 5 Drawing Figures

PRODUCTION OF MODULATION SIGNALS FROM AUDIO FREQUENCY SOURCES TO CONTROL COLOR CONTRIBUTIONS TO VISUAL DISPLAYS

BACKGROUND OF THE INVENTION

1. Field of the Invention

The present invention pertains to modulating circuitry for electronically-controlled visual display systems. More particularly, the present invention relates to methods and apparatus for modulating the electron beams in color television receivers and eidophor systems. The present invention finds particular application to visual displays generated in response to audio input signals.

2. Description of Prior Art

Audio-Visual systems are currently known whereby audio frequency signals are fed to a modulating device used to control a light display. Thus, for example, sound waves, picked up by a microphone and appropriately amplified, may be used to alter the power fed to a system of lights, thereby selectively varying the intensity of light produced by different elements in the light display to reflect qualities of the original sound waves. By filtering the audio frequency signals, multiple modulating signals may be produced covering different portions of the audio frequency spectrum. By controlling different segments of the light display by the different modulating signals, a changing light display may be achieved in accordance with the variations in the original sound waves. Intensity of light produced may be linked to the volume of sounds in the frequency range of the corresponding modulating signal.

It is well known in the art that audio frequency signals may be used to produce patterns on cathode ray tubes (CRT). Such a practice is frequently carried out employing the CRT of an oscilloscope. It has also become well known in the art to use the CRT of a television receiver as a means of displaying signals generated for particular purposes divorced from standard television production. Thus, for example, control systems are available by which action game boards may be displaced on the screens of television receivers. The mechanisms by which such controls are effected are relatively complex, and are limited in their use to specific purposes.

SUMMARY OF THE INVENTION

An audio modulator of the present invention includes filter devices for receiving audio frequency input signals and separating such signals into a plurality of modulating signals, wherein each modulating signal is characterized by a frequency range. The frequency ranges may be mutually exclusive, or they may overlap. Signal processing circuitry operates on one or more of the modulating signals. Such operations include selectively blocking and transmitting a modulating signal by a gating circuit responding to enabling signals from a signal generator acting as a gate control device. While the signal generator may produce enabling signals according to any desired scheme, such enabling signals may reflect one or more parameters of the modulating signal being so processed. In such case, a detector device samples the modulating signal to obtain a value of the parameter in question, and communicates a control signal, in response thereto, to vary the enabling signals produced by the signal generator accordingly. The modulating signals, including those having been intermittently blocked and transmitted by gating circuits, are communicated to controlling circuits for electron beams of visual display systems, whereby the scanning electron beams are modulated in response to the particular communicated modulating signals. The communication to the control circuits may be relatively direct, or may be accomplished by way of a transmission signal.

In a particular embodiment of the invention, the filtering devices separate the input audio frequency signals into three audio modulating signals characterized by high, medium, and low frequency ranges, respectively. The signal generator used to selectively enable a particular gating circuit is a voltage controlled oscillator, whose frequency of oscillation varies in accord with the value of an input voltage control signal. This control signal is supplied by a level detector, which samples the amplitude of the filtered signal. With two or more such voltage controlled oscillators operating to so process particular modulating signals, the average, or base, frequencies of oscillation of the respective voltage controlled oscillators may be different. Each modulating signal is communicated to modulate one electron beam in a color television picture tube. Trigger signals obtained by pulse shaping circuitry acting on the modulating signals, or from the enabling signal output of one or more voltage controlled oscillators, may be communicated to synchronizing circuitry to trigger scanning of the visual display. Such an individual trigger signal may effect triggering of a particular scan if the trigger signal exhibits coincidence with the scan signal. Thus, a pattern of colors is produced on the screen, with each electron beam varying in response to audio frequency signals of generally different frequencies, with at least one modulating signal further altered by a gating circuit, whose operation is also varying.

A combination of two or more audio modulators, coupled with corresponding CRT's, provide separate audiomodulated visual displays corresponding to individual audio frequency input signals obtained from a multichannel audio source. Thus, for example, the two channels of audio frequency signals provided by a stereophonic sound reproduction system may be fed to separate audio modulators of the present invention to generate visual displays on two separate television receiver screens.

Other types of visual display systems may also be modulated according to the present invention. Thus, for example, audio modulating signals from an audio modulator may be used to control the scanning of eidophor systems.

Methods of the present invention include steps of separating audio frequency input signals into a plurality of audio modulating signals, each signal characterized by a frequency range. One or more of such modulating signals is then processed by being intermittently blocked and transmitted. The pattern of blocking and transmitting such processed modulating signal may be governed by any type enabling signal, particularly that generated by an oscillating device. Such pattern of blocking and transmitting may be particularly governed by an oscillating signal whose frequency of oscillation is varied in accordance with a parameter of the filtered audio signal, such as its amplitude. The modulating signals, including those so processed as described hereinbefore, are communicated for controlling scanning electron beams of a visual display system, wherein one such modulating signal controls one electron beam.

Additionally, the signal generators, such as the oscillator, used to determine the pattern of blocking and transmitting modulating signals, and/or the modulating signals themselves, may serve to provide triggering signals by which the circuits controlling the synchronization of scan of the electron beams may be triggered.

Apparatus and method of the present invention provide an audio-visual display mechanism by which the presentation on a cathode ray tube, or other visual display devices may be varied in color as well as pattern. In particular, when voltage controlled oscillators of varying frequency dependent upon amplitude of the corresponding modulating signals are used to vary the gating of such modulating signals, various patterns of color bars and checks may be obtained. As the synctriggering signals from the audio modulator vary in frequency, and the spectral characteristics of the modulating signals themselves vary with time, the pattern displayed on the screen changes with time, resulting in a sequence of unique color light patterns. When no sync-triggering is effected by the modulator, the patterns may be even more subject to change. It will be appreciated that such results are not readily available with the type of static light source display mechanisms currently in the art. Furthermore, the introduction of the audio modulator of the present invention provides a novel and profound combination including cathode ray tubes and eidophor systems.

DESCRIPTION OF PREFERRED EMBODIMENTS

Figure 1:
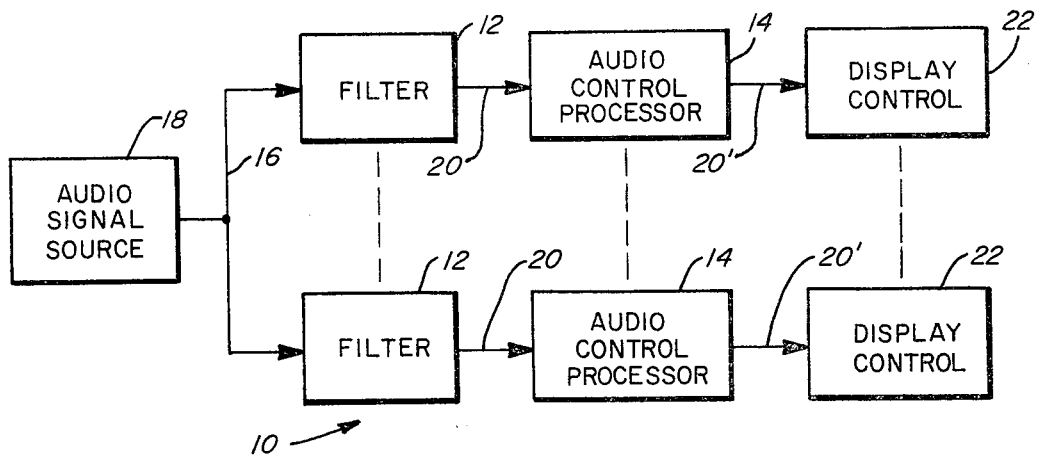
FIG. 1 is a block diagram broadly illustrating the basic components used in the present invention.

The audio modulator of the present invention is illustrated generally at 10 in FIG. 1. The basic components of the audio modulator 10 are indicated as filters 12 and audio control processors 14. As shown, two or more such filters 12, each with corresponding audio control processor 14, may be included as part of the audio modulator 10. Audio frequency input signals 16 are received from an audio signal source 18, and separated by the plurality of filters 12 into a plurality of audio modulating signals 20. The audio modulating signals 20 may each be acted on by a separate audio control processor 14 to provide a processed modulating signal 20' for ultimate communication to the control circuitry 22 of a cathode ray tube electron gun or other visual display device. The audio control processors 14 are considered, with reference to FIG. 1, in general terms only. The construction and operation of individual such audio control processors are considered in more detail hereinafter, and may range from means inducing a relatively complex effect to simple transmission of one or more of the modulating signals are emerging from the filters 12, and as indicated by 20.

Reference to like elements of the present invention, as well as to related components, are made herein by like numerals, although it will be appreciated that such invention elements and related components may appear in various configurations to constitute different embodiments of the present invention. However, where necessary to indicate different varieties of like elements, distinguishing letter marks accompany the aforementioned numerical marks.

Figure 2:
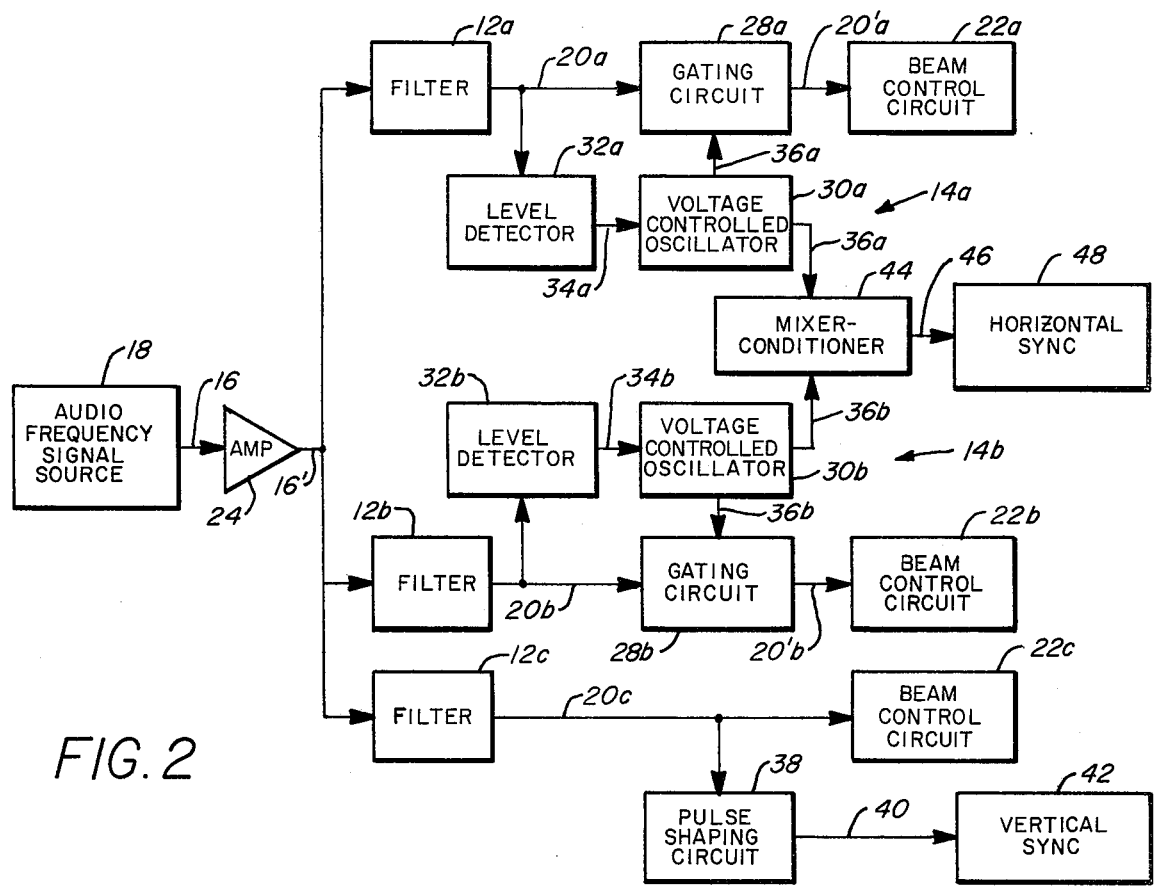
FIG. 2 is a block diagram illustrating elements of one embodiment of the audio modulator of the present invention.

Details of a particular audio modulator embodiment of the present invention, as may be incorporated in an otherwise standard color television receiver or eidophor system, are shown in FIG. 2. The input audio frequency signals 16 from the source 18 are fed to an amplifier 24 equipped with automatic gain control to maintain a proper input signal level. The amplified audio input signals 16' are then acted on by three filters, 12a, 12b, and 12c. Each such filter passes signals in a specific frequency range, and the three frequency ranges may be selected to be mutually exclusive, or to overlap as desired. Thus, for example, filter 12a may be a high pass filter, communicating frequencies in a range from, say, 1 Khz to 20 Khz, to isolate a high frequency modulating signal 20a. A medium frequency modulating signal 20b may be produced by filter 12b, operating to pass frequencies ranging from say 200 Hz to 2 Khz. The third filter 12c may be chosen to pass a low frequency modulating signal 20c, characterized by the frequency range of, say, 10 Hz to 500 Hz.

A control processor at 14a operates on the high frequency modulating signal 20a to produce the processed modulating signal 20'a. The audio processor 14a includes a gating circuit 28a, intermittently enabled by enabling signals from a gate control device 30a, in the form of a voltage controlled oscillator, which in turn receives control signals from a detector device, in the form of a level detector 32a. Thus, the level detector 32a samples the filtered signal 20a and seeks the mean amplitude of the modulating signal during a specific time period. The mean amplitude thus measured determines an output control signal value from the level detector 32a. The control signal then slowly changes in value in accordance with the magnitude of the filtered signal 20a.

The varying output control signals thus produced by the level detector 32a are fed at 34a to the voltage controlled oscillator 30a. In the absence of such input control signals 34a, the voltage controlled oscillator will maintain a square wave oscillatory output signal at a specific average, or base, frequency. This base frequency may be predetermined as desired, but may typically be chosen to be on the order of 100 Khz to 1,000 Khz. For example, the base frequency of the voltage controlled oscillator 30a may be set at 300 Khz. Then, as the varying input control signals 34a are received by the voltage controlled oscillator 30a in response to the amplitude sampling by the level detector 32a, the frequency of the output signals generated by the voltage controlled oscillator vary with time. Thus, this output frequency may be altered in response to such an input control signal 34a, and assume new frequency values in accordance with the magnitude of the control signal generated by the level detector 32a. Enabling signals 36a, of frequency whose variation is dependent in part on the amplitude sampled in the modulating signal 20a, are therefore fed to the gating circuit 28a such that the gating circuit is enabled to pass the modulating signal 20a in time with the varying oscillations of the enabling signals. Thus, the processed modulating signal 20'a exhibits a spectral response varying with time as the upper frequency segment of the input audio frequency signal 16, and which is intermittently interrupted and transmitted in response to the varying enabling signals 36a.

A similar audio processor 14b operates on the medium frequency range modulating signal 20b to produce the processed modulating signal 20'b. A gating circuit 28b receives varying-frequency square wave enabling signals 36b from a voltage controlled oscillator 30b. A level detector 32b samples the amplitude of the modulating signal 20b to produce control signals 34b fed to the voltage controlled oscillator 30b. The base frequency of the voltage controlled oscillator 30b may be set at any desired value, and may be the same as that of the voltage controlled oscillator 30a. Typically, the two voltage controlled oscillators 30a and 30b may feature different base frequencies. For example, with the base frequency of the voltage controlled oscillator 30a set at 300 Khz, the base frequency of the voltage controlled oscillator 30b may be adjusted to 100 Khz. Similarly, the time constants of the two level detectors 32a and 32b may be equal or different in value. In any event, the processed medium frequency modulating signal 20'b exhibits a spectral response varying in time according to the medium frequency portion of the audio input signal 16, and which is intermittently blocked and transmitted by the gating circuit 28b in accordance with the varying enabling signals 36b.

Each of the processed modulating signals 20'a and 20'b are communicated to electron beam control circuits 22a and 22b, respectively, associated with the cathode ray tube of a television receiver (not shown) or with an eidophor display system. As is well known in the field, the three electron guns within a color television cathode ray tube are separately operated to selectively generate beams of electrons to stimulate color light emission on the tube screen. Similarly, the production of color eidophor displays may be achieved by combining three separate, single-color images, each controlled by a single modulated beam. The various combinations of color light so emitted may then be combined to produce the visual display that may be observed on the television or eidophor screen as information. Thus, one modulating signal may be used to control the presentation of one of the three basic colors generated by one of the electron beams by being appropriately communicated to the control circuit related to that particular electron beam. In the case indicated in FIG. 2, the high frequency range processed modulating signal 20'a may be communicated to the beam control circuit corresponding to the basic color blue, while the medium frequency range processed modulating signal 20'b may be used to modulate the electron beam for stimulating the color green. Then, the remaining color red may be modulated by communicating the low frequency range modulating signal 20c to the corresponding beam control circuit 22c. In such case, the audio control processor 14, as indicated in FIG. 1, is not readily identifiable in the arrangement of FIG. 2 as performing any specific operation on the low frequency modulating signal 20c, other than to communicate this signal to the appropriate beam control circuit 22c. However, an audio control processor (not shown), including a gating circuit, voltage controlled oscillator, and level detector may also be used to process the low frequency signal 20c.

A pulse shaping circuit 38 receives the modulating signal 20c and operates thereon to produce triggering signals 40 which may then be communicated to the synchronization scan circuit 42 of the display system. As an alternative, such sync-triggering by the audio modulator may be omitted, permitting the modulation of the electron beams to be independent of the scanning sequences. The pulse shaping circuit 38 may be any type circuit which provides appropriate triggering pulses to trigger the scanning by the electron beams in one sense, say, for example, the vertical sense. Thus, the pulse shaping circuit 38 may include a differentiator, whose output takes the form of a sequence of spikes, varying in time depending on the frequency variations of the modulating signal 20c. Similar synchronization-triggering pulses may be obtained by combining the enabling signals 36a and 36b of the two voltage controlled oscillators 30a and 30b, respectively, in a mixer-conditioner circuit 44. As an alternative, only one such enabling signal, 36a and 36b, may be used to produce a sync-triggering signal. Circuit 44 produces a sequence of triggering pulses 46, which may be communicated to the horizontal scan synchronization control circuit 48. Thus, in addition to modulating the intensity of each of the electron beams of a color television picture tube, for example, the audio modulating signals 20a, 20b and 20c also influence the triggering of the television picture screen sweep circuits. However, these same sweep circuits may be allowed to run free.

Figure 3:
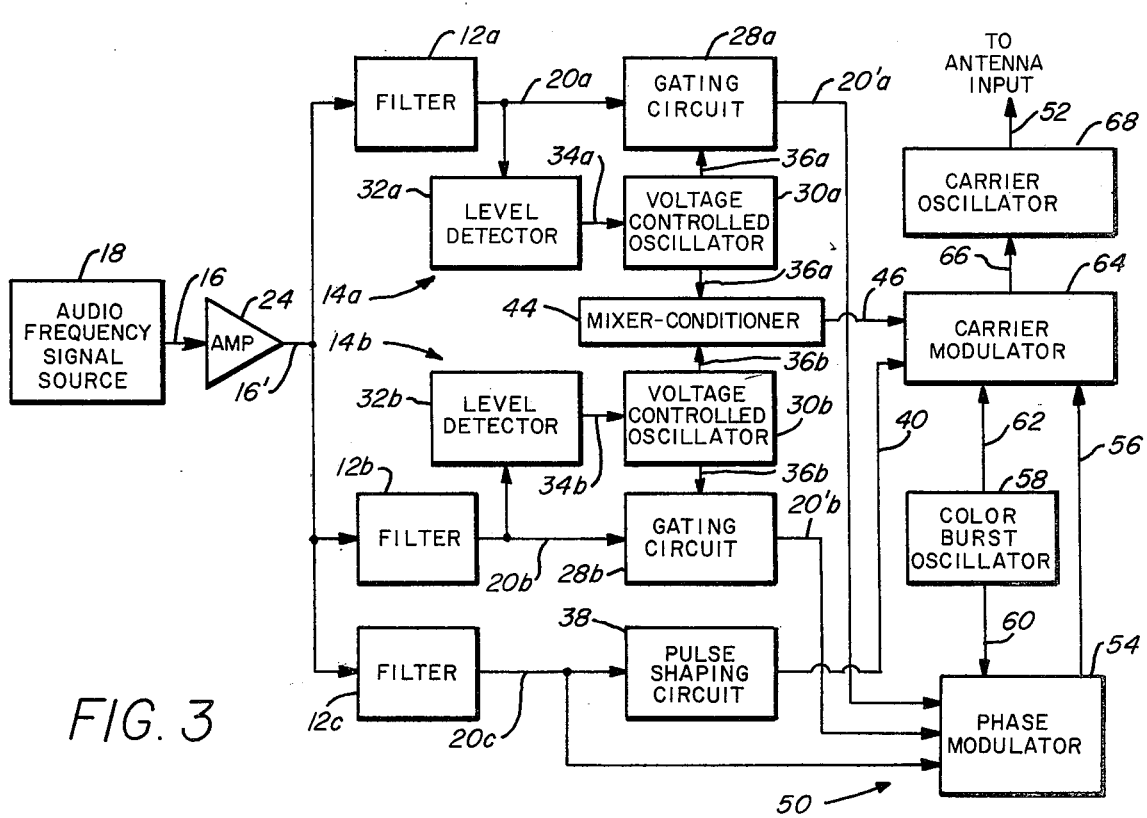
FIG. 3 is a block diagram similar to FIG. 2, indicating additional transmission circuitry for communicating the modulating signals from the audio modulator to the antenna input of a television receiver.

The elements 12 through 44 shown in FIG. 3 may be identical, or similar, to correspondingly numbered elements indicated in FIG. 2. Transmission circuitry, shown generally at 50 and well known in the field, is combined with aforementioned elements from FIG. 2 to provide output control signals 52 for communication to the antenna input of a color television receiver or other display system (not shown).

Modulating signals 20'a, 20'b and 20c are combined, by a phase modulator 54, in a phase-modulated color information signal 56. A color burst oscillator 58 provides reference frequency signals 60 and 62, fed to the phase modulator 54 and a carrier modulator 64, respectively. The scanning trigger signals 40 and 46 are also fed to the modulator 64. The carrier modulator 64 thus contains the color information, scan triggering and reference frequency information. A carrier oscillator 68 is modulated by the carrier modulator 64 by connection 66 to produce the composite output control signals 52 for reception by an antenna input of the television receiver or other visual display system. The reference frequency signal 62 is able to be sampled and copied by the receiver, and used to demodulate the composite signal 52. Thus, the color modulation information originally presented by the three modulating signals 20'a, 20'b and 20c is provided for operation on the three control circuits controlling color contributions to the visual display of the visual display system.

By use of the transmission circuitry at 50, the audio modulator of the present invention may thus be employed as an external component which may be fitted generally to any color television receiver or other visual display device featuring a scanning technique for generating varying visual displays. Furthermore, this connection may be readily achieved by simply communicating the output signals 52 from the transmission circuitry 50 to the antenna input of the display device in question.

Figure 4:
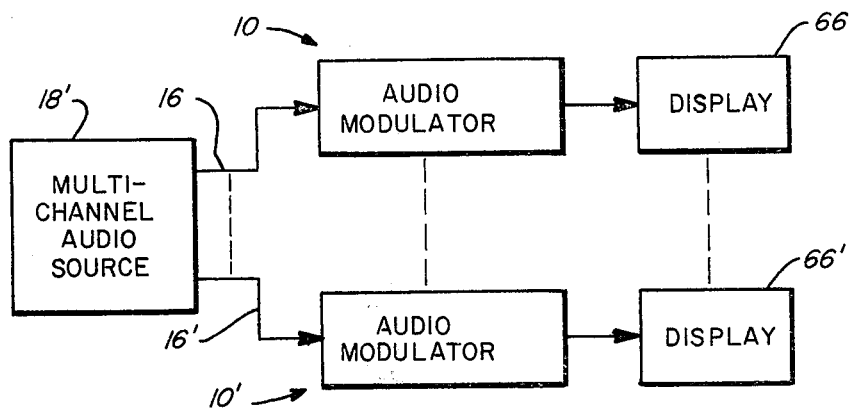
FIG. 4 is a block diagram illustrating the application of the present invention to a multi-channel audio source.

As indicated in FIG. 4, the audio modulator 10 of the present invention may be employed in conjunction with a multi-channel audio source 18'. Typical examples of such audio source 18' include two-channel stereophonic sound reproduction systems, four-channel quadrophonic sound systems, and any "live" multi-microphone amplification system in which the individual microphone signals may be communicated generally separately. It will be appreciated that, in the last case, virtually any number of audio signals may be provided by the source 18'. Whatever the number of audio source signals provided, a separate modulator 10 through 10' may be used for each individual input audio signal 16 through 16'. Typical audio modulators 10 through 10' of the present invention for use in the system of FIG. 4 may be of the type shown in FIG. 2 or FIG. 3, or any variation thereof within the scope of the invention. Thus, for example, the audio modulators used in the multi-channel system of FIG. 4 may employ any number of filters 12 and a corresponding number of audio control processors 14, wherein each audio control processor may be varied within the scope of the invention as described hereinbefore. Each audio modulator may then control the electron beams of a visual display device 66 through 66'.

FIG. 5, in separate parts, illustrates schematically the type of effects that can be produced by modulating electron beams of a cathode ray tube, or of an eidophor system, with the modulating signals provided by the present invention. The particular patterns shown in FIG. 5 may be achieved by control of the particular color guns by the specified modulating signals, along with the frequency values stated hereinbefore by way of example. Thus, the guns for generating blue and green are controlled by the high and mid-range frequency modulating signals, respectively, both of which are processed with the use of voltage controlled oscillators. The latter oscillators may also provide the horizontal sync-triggering signals. The low frequency range modulating signal controls the red-producing gun, and may also be the source for vertical sync-triggering signals. In this example, the mid-range modulating signal 20'b produces a pattern of diagonal bars, checks, vertical bars, or horizontal bars as indicated in FIGS. 5A, 5B, 5C, and 5D respectively. The particular type of pattern is determined by the relationship of the frequencies of the modulating signal 20'b with that of the CRT vertical and horizontal scan frequencies. Thus, as the spectral character of the modulating signal 20'b varies, the pattern produced by the gun modulated by that modulating signal changes form. Also, the size and positions of the bars or checks in a particular pattern depend on the phase relationship between the frequency of the enabling signal 36b with respect to the scanning frequencies. Thus, if the audio input signal 16 consists of sounds with frequencies within the range passed by the filter 12b, but blocked by the filters 12a and 12c, then a pattern of green bars or checks appears on the CRT screen, and this pattern continuely changes in form, dimension and position as the spectral character of the input audio signal changes.

The preceding discussion of the generated green patterns applies also, in general, to the generation of blue patterns on the CRT screen, with the exception that the bars and checks generated by this electron gun are independently controlled by the processed high frequency modulating signal 20'a and are thinner than those of the green display, generated by the mid-range modulating signal 20'b. This is true because the audio frequency range passed by the filter 12a and the base frequency of the voltage controlled oscillator 30a are both, in general, higher than the corresponding values related to the mid-range modulating signal 20b. Thus, a blue-only pattern, produced by an audio input signal 16 of exclusively high frequencies, may consist of bars or checks, with the pattern changing in configuration, size and position as the spectral quality of the high frequency modulating signal 20a changes.

Figure 5A:
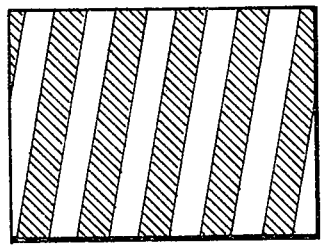
FIG. 5 is an illustration, in parts "A" through "E," showing various patterns which may be obtained on a color television screen employing the audio modulator of the present invention.
Figure 5B:
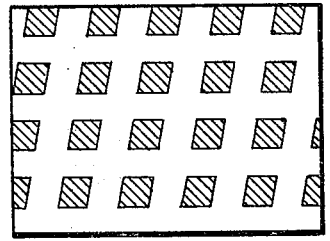
Figure 5C:
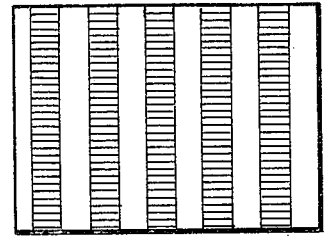

For simplicity. FIG. 5A and 5B have been shaded to indicate green patterns, while FIG. 5C has been shaded to indicate a blue pattern and FIG. 5D to indicate a red pattern. However, it will be appreciated from the previous remarks that any one of these four patterns may be produced in either blue or green, and that the relative dimensions of the bars and checks shown therein are not intended to be specific with respect to the numerical values of the various frequencies involved.

Figure 5D:
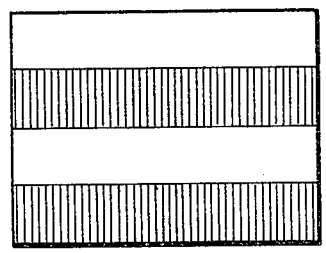

A red-only screen display, generated in response to an audio input signal consisting exclusively of low frequencies, would appear as horizontal red bars on the screen, as indicated in FIG. 5D. The positions and the width, and, therefore, the number of the red bars depend on the relation between the spectral character of the modulating signal 20c, as well as the frequency of pulses in the triggering signal 40, and the vertical scan frequency of the CRT.

In all cases, the intensities of the individual color patterns are controlled by the amplitude of the corresponding audio signal. Also, where the frequency ranges of the filters 12a, 12b, and 12c overlap, it will be appreciated that an audio frequency input signal 16, containing non-zero amplitude values in the overlap regions, will cause modulation of two electron beams by the same overlap-frequency audio signal input.

Figure 5E:
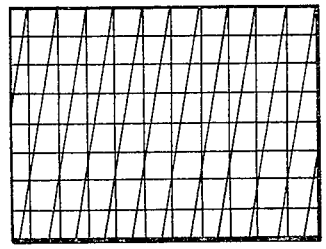

The patterns illustrated in FIGS. 5A–5D represent single-color displays, that is, any one such pattern may be visible when the audio frequency input signal 16 is such that only one modulating signal is present. In general, however, the spectral character of the audio frequency input signal 16 will be such that all three modulating signals may be present, causing all three electron beams to generate color displays. It will be appreciated that, even though, in a particular case, the frequency ranges of the modulating signals may overlap, each of the three color patterns is produced and controlled independently of the other two. However, when two or more such color patterns are generated, their mutual superposition on the display screen causes the superimposed colors to combine to produce composite color patterns, with possibly any color present. Thus, by combining blue, green and red patterns in the form of moving bars and, possibly, checks, a complex, changing pattern of all possible colors may be obtained. Furthermore, as the spectral character of the audio frequency input signals change with time, the resultant pattern on the screen also changes. See FIG. 5E is intended to schematically indicate the momentary, possible superposition of bar and check patterns. However, for purposes of clarity, FIG. 5E is not shaded to indicate the many possible colors that might be present in such a pattern.

Method and apparatus of the present invention provide visual display patterns, and the changing of such patterns, which reflect the spectral character of audio frequency signals. The selection and use of one or more gating control devices, particularly in the form of oscillators, add to the intricacy of the patterns so generated, as well to their mode of changing. The present invention features broad latitude for varying the processing of the modulating signals, as well as the choice of the number of such modulating signals and their respective frequency ranges. Thus, for example, a single modulating signal from the audio modulator may be used to operate on two or more controls circuits to modulate the contributions in the visual display of two or more colors. Furthermore, triggering of scanning by the visual display system may be provided by the audio modulator in any appropriate manner. Also, as noted hereinbefore, scanning in one or both scan senses may be left free running, with no synchronization with the audio modulator.

Additionally, the present invention may be applied to a variety of audio frequency signal producing systems, including multi-channel systems. Also, in general, any number of visual display systems may be employed, with their respective electron beams controlled by the audio modulating signals. Although the present invention may be employed with single-gun, black-and-white cathode ray tubes, or eidophor systems, wherein, for example, the application of different modulating signals to the gun control circuitry may be altered, or more than one such CRT or eidophor system may be used, with each electron gun controlled by a different modulating signal, it will be appreciated that more profound and intricate patterns may be obtained using color television receivers or eidophor systems as described in detail hereinbefore. In general, method and apparatus of the present invention may be employed to modulate visual displays in any type system which generates visual displays by periodic scanning of the display device, or related apparatus.

The foregoing disclosure and description of the invention is illustrative and explanatory thereof, and various changes in the method steps as well as in the details of the illustrated apparatus may be made within the scope of the appended claims without departing from the spirit of the invention.

I claim:
1. Apparatus for modulating electronically controlled visual display systems comprising:
  (a) processing means for operating on audio frequency modulating signals to produce processed modulating signals for communication to at least one control circuit of a visual display system, whereby said control circuit controls the contribution of at least one color in a visual display of the visual display system, and for operation on said control circuit to modulate said contribution of color in said visual display;
  (b) gating circuit means, as part of said processing means, for operating on at least one said modulating signal to selectively permit or block said communication of said modulating signal;
  (c) gate control means, as part of said processing means and including voltage controlled oscillator means, for generating enabling signals for selectively enabling said gating circuit means for so permitting said modulating signal communication such that the frequency of each such enabling signal so generated is determined, at least in part, based on the value of a parameter of the corresponding modulating signal being so operated on by said gating circuit means in response to said enabling signal; and
  (d) detector means, as part of said processing means, for responding to a parameter of each modulating signal so operated on by said gating circuit means to produce control signals, corresponding to each such modulating signal, for communication to said gate control means to operate on said voltage controlled oscillator means to vary the frequency of each enabling signal so enabling the gating circuit means operating on the corresponding modulating signal.

2. Apparatus as defined in claim 1 wherein said detector means responds to amplitude of said modulating signals to produce control signals in response thereto.

3. Apparatus as defined in claim 2 further comprising filter means for receiving said input audio frequency signals and separating said input signals into a plurality of said modulating signals, each modulating signal being characterized by a frequency range.

4. Apparatus as defined in claim 1 wherein:
  (a) said visual display system includes three control circuits with each such control circuit for controlling the contribution of a different color in the visual display of said visual diplay system; and
  (b) one said modulating signal is provided to effect modulating of said contribution of one said color in said visual display.

5. Apparatus as defined in claim 1 further comprising filter means for receiving input audio frequency signals and separating said input signals into a plurality of said modulating signals, each modulating signal being characterized by a frequency range.

6. Apparatus as defined in claim 5 wherein input audio frequency signals are received from multiple audio signal sources, and including multiple visual display systems, with said modulating signal from each audio signal source communicated for modulating color contributions in a visual display of a different visual display system of said multiple visual display systems.

7. Apparatus as defined in claim 5 wherein said filter means separates said input audio frequency signals generally into three modulating signals, identifiable by high, medium and low frequency ranges, respectively.

8. Apparatus as defined in claim 5 wherein:
  (a) said visual display system includes three control circuits with each such control circuit for controlling the contribution of a different color in the visual display of said visual display system;
  (b) said filter means separates said input audio frequency signals generally into three modulating signals, identifiable by high, medium, and low frequency ranges, respectively; and
  (c) one said modulating signal is provided to effect modulation of said contribution of one said color in said visual display.

9. Apparatus as defined in claim 8 wherein said detector means responds to amplitude of said modulating signals to produce control signals in response thereto.

10. Apparatus as defined in claim 8 wherein two of said three modulating signals are operated on by corresponding said gating circuit means.

11. Apparatus as defined in claim 10 wherein said gate control means enabling said gating circuit means so operating on said two modulating signals provides a trigger signal for triggering scanning of said visual display in one sense.

12. Apparatus as defined in claim 11 further comprising pulse shaping means for receiving and operating on said third modulating signal for generating a trigger signal for triggering scanning of said visual display in a second sense orthogonal to said one sense.

13. Apparatus as defined in claim 1 wherein said processing means include pulse shaping means for generating trigger signals for communication to synchronization circuitry of said visual display system control circuits to trigger scanning of said visual display.

14. Apparatus as defined in claim 1 wherein said visual display systems include at least one eidophor system.

15. Apparatus as defined in claim 1 wherein said visual display systems include at least one color television receiver system.

16. Apparatus as defined in claim 1 further comprising transmission circuitry means for combining said signals, to be communicated to said control circuits of said visual display systems, for transmission to antenna reception means through which said control circuits of said visual display systems may receive said signals to be communicated.

17. Apparatus as defined in claim 1 wherein input audio frequency signals are received from multiple audio signal sources, and including multiple visual display systems, with said modulating signals from each audio signal source communicated for modulating color contributions in a visual display of a different visual display system of said multiple visual display systems.

18. A method of modulating electronically controlled visual display systems comprising the steps of:
 (a) providing gating circuitry, gate control means, including variable signal generation means, and detector means;
 (b) receiving one or more input audio frequency signals for use as modulating signals;
 (c) sampling at least one said modulating signal with said detector means to thereby generate control signals in response to a parameter of each such modulating signal so sampled;
 (d) controlling said gate control means by said control signals to produce enabling signals dependent, at least in part, on said control signals;
 (e) operating on said modulating signals, so sampled, by said gating circuitry to selectively permit or block transmission of said sampled modulating signals in response to corresponding enabling signals received by corresponding gating circuitry; and
 (f) communicating said modulating signals, including said modulating signals so sampled and so operated on by said gating circuitry, to at least one control circuit of a visual display system, wherein each such control circuit controls the contribution of at least one color in a visual display of the visual display systems, and thereby operating on said control circuits to modulate said contributions of color in such visual displays.

19. A method as defined in claim 18 further comprising the additional step of separating said input audio frequency signals into a plurality of said modulating signals, each characterized by a frequency range.

20. A method as defined in claim 19 wherein:
 (a) said modulating signal parameter to which said detector means responds is amplitude;
 (b) said variable signal generation means comprises voltage controlled oscillator means; and
 (c) said control signals, so generated by said detector means in response to said sampled modulating signal amplitude, so control said voltage controlled oscillator means to vary the frequency of said corresponding enabling signals.

21. A method as defined in claim 18 further comprising the additional steps of:
 (a) providing scan triggering signals, by at least one said modulating signal, to trigger scanning of said visual display in one sense; and
 (b) providing other scan triggering signals, by said gate control means, to trigger scanning of said visual display in a second sense orthogonal to said one sense.

22. A method as defined in claim 18 whereby said communicating of said modulating signals is carried out by way of transmission circuitry for generating output signals for reception by input antenna means of said visual display systems.

23. A method as defined in claim 18 further comprising the additional steps of carrying out the steps of claim 18 for each of the audio frequency signals of a multi-channel audio signal source, and whereby each separate audio frequency signal provides modulating signals for modulating color contributions in a different visual display system.

* * * * *